(12) United States Patent
Wei et al.

(10) Patent No.: US 10,030,814 B2
(45) Date of Patent: Jul. 24, 2018

(54) COUPLING GUARD

(71) Applicant: Ebara Corporation, Tokyo (JP)

(72) Inventors: Wei Wei, Tokyo (JP); Junya Kawabata, Tokyo (JP); Shoji Ito, Tokyo (JP); Miwa Hidekura, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 148 days.

(21) Appl. No.: 15/135,865

(22) Filed: Apr. 22, 2016

(65) Prior Publication Data

US 2016/0312954 A1    Oct. 27, 2016

(30) Foreign Application Priority Data

Apr. 27, 2015 (JP) ................... 2015-090813

(51) Int. Cl.
| | | |
|---|---|---|
| *F16D 3/84* | (2006.01) | |
| *F16P 1/02* | (2006.01) | |
| *F01D 21/04* | (2006.01) | |
| *F01D 25/24* | (2006.01) | |

(52) U.S. Cl.
CPC .............. *F16P 1/02* (2013.01); *F01D 21/045* (2013.01); *F01D 25/243* (2013.01); *F16D 3/843* (2013.01)

(58) Field of Classification Search
CPC ........ F16P 1/02; F01D 21/045; F01D 25/243; F16D 3/843

USPC ................................... 464/176, 177
See application file for complete search history.

(56) References Cited

U.S. PATENT DOCUMENTS

| | | | |
|---|---|---|---|
| 577,284 A | * | 2/1897 | Camp |
| 1,432,098 A | * | 10/1922 | Benedict .................... F16P 1/02 |
| 6,190,261 B1 | * | 2/2001 | Powell ..................... F16D 3/843 |
| 2016/0305607 A1 | * | 10/2016 | Kyo .......................... F16P 1/02 |

FOREIGN PATENT DOCUMENTS

JP        2014-074456 A     4/2014

* cited by examiner

*Primary Examiner* — Greg Binda
(74) *Attorney, Agent, or Firm* — Pearne & Gordon, LLP (57) ABSTRACT

A coupling guard for covering a coupling which couples a drive shaft of a prime mover and a rotational shaft of a rotary machine to each other. The coupling guard includes a cylindrical guard body having an upper semicylindrical member and a lower semicylindrical member coupled to the upper semicylindrical member, and a guard leg supporting the guard body. The guard body has a flange portion to which the guard leg is attached. The guard leg includes a vertical wall parallel to a central axis of the guard body, an upper wall, a bottom wall, a left-side wall, and a right-side wall which project perpendicularly outwardly from the vertical wall. The vertical wall, the upper wall, the bottom wall, the left-side wall, and the right-side wall are made of a single plate material.

10 Claims, 9 Drawing Sheets

(STEP 1)

(STEP 2)

(STEP 3)

COUPLING GUARD

CROSS REFERENCE TO RELATED APPLICATION

This document claims priority to Japanese Patent Application No. 2015-090813 filed Apr. 27, 2015, the entire contents of which are hereby incorporated by reference.

BACKGROUND

There has been known a machine apparatus in which a rotational shaft of a rotary machine is coupled to a drive shaft of a prime mover through a coupling (or a shaft coupling) and the drive shaft is rotated to thereby rotate the rotational shaft. One example of such a machine apparatus is a pump apparatus. The pump apparatus includes a motor which is a prime mover, and a pump which is a rotary machine. A drive shaft of the motor is coupled to a rotational shaft of the pump by the coupling. In the pump apparatus, a torque of the drive shaft of the motor is transmitted to the rotational shaft of the pump through the coupling, thereby rotating an impeller which is fixed to the rotational shaft.

Usually, a coupling guard, which covers the coupling and a vicinity of the coupling, is provided so that a human being does not touch the coupling, an exposed portion of the rotational shaft of the pump, and an exposed portion of the drive shaft of the motor when they are rotating at a high speed.

The coupling guard is installed in the pump apparatus when an operation of the pump apparatus is stopped and the drive shaft of the motor and the rotational shaft of the pump are coupled to each other. Removal of the coupling guard is also conducted when the drive shaft of the motor and the rotational shaft of the pump are coupled to each other. However, it takes a lot of time to install and remove the coupling guard when the drive shaft of the motor is coupled to the rotational shaft of the pump, because the coupling guard is made up of many parts. This problem can occur not only in the pump apparatus, but also in all machinery which uses a coupling through which a rotational shaft of a rotary machine is coupled to a drive shaft of a prime mover.

SUMMARY OF THE INVENTION

According to an embodiment, there is provided a coupling guard which can be easily installed and removed, with a drive shaft of a prime mover being coupled to a rotational shaft of a rotary machine.

Embodiments, which will be described below, relate to a coupling guard for covering a coupling which is used to couple a rotational shaft of a rotary machine, such as a pump, to a drive shaft of a prime mover, such as a motor.

In an embodiment, coupling guard for covering a coupling which couples a drive shaft of a prime mover and a rotational shaft of a rotary machine to each other, the coupling guard comprising: a guard body in a cylindrical shape, the guard body having an upper semicylindrical member and a lower semicylindrical member coupled to the upper semicylindrical member; and a guard leg supporting the guard body, wherein the guard body has a flange portion to which the guard leg is attached, the guard leg includes a vertical wall parallel to a central axis of the guard body, and further includes an upper wall, a bottom wall, a left-side wall, and a right-side wall which project perpendicularly and outwardly from the vertical wall, and the vertical wall, the upper wall, the bottom wall, the left-side wall, and the right-side wall are constituted by a single plate material.

In an embodiment, the flange portion and the guard leg are coupled to each other by a fastening tool; the flange portion has an oblong hole in which the fastening tool is inserted; and the oblong hole extends parallel to the central axis of the guard body.

In an embodiment, the guard leg has a shape which is bilaterally symmetrical with respect to a vertical line extending through a center of the guard leg.

In an embodiment, the upper wall and the bottom wall have been welded to the left-side wall and the right-side wall.

In an embodiment, the fastening tool comprises a bolt and a nut, the upper wall of the guard leg has a through-hole in which the bolt is inserted, and the nut has been welded to a lower surface of the upper wall, the through-hole and the nut being concentric.

In an embodiment, the bottom wall of the guard leg has a cutout in which a screw is inserted, and the cutout is formed in an outer edge of the bottom wall.

In an embodiment, the lower semicylindrical member has a drain hole formed in a lowermost portion of the lower semicylindrical member.

In an embodiment, the coupling guard further comprises an annular wall disposed on the guard body, the annular wall being perpendicular to the central axis, and the annular wall having a hole through which the drive shaft or the rotational shaft can extend.

According to the above-described embodiments, the coupling guard has a simple structure and is made of a few parts. Therefore, the coupling guard can easily be installed and removed while the drive shaft of the prime mover and the rotational shaft of the rotary machine are coupled to each other.

DESCRIPTION OF EMBODIMENTS

Embodiments will be described below with reference to the drawings. In FIGS. 1 through 10, identical or corresponding components are denoted by identical reference numerals, and repetitive descriptions thereof will be omitted.

Figure 1:
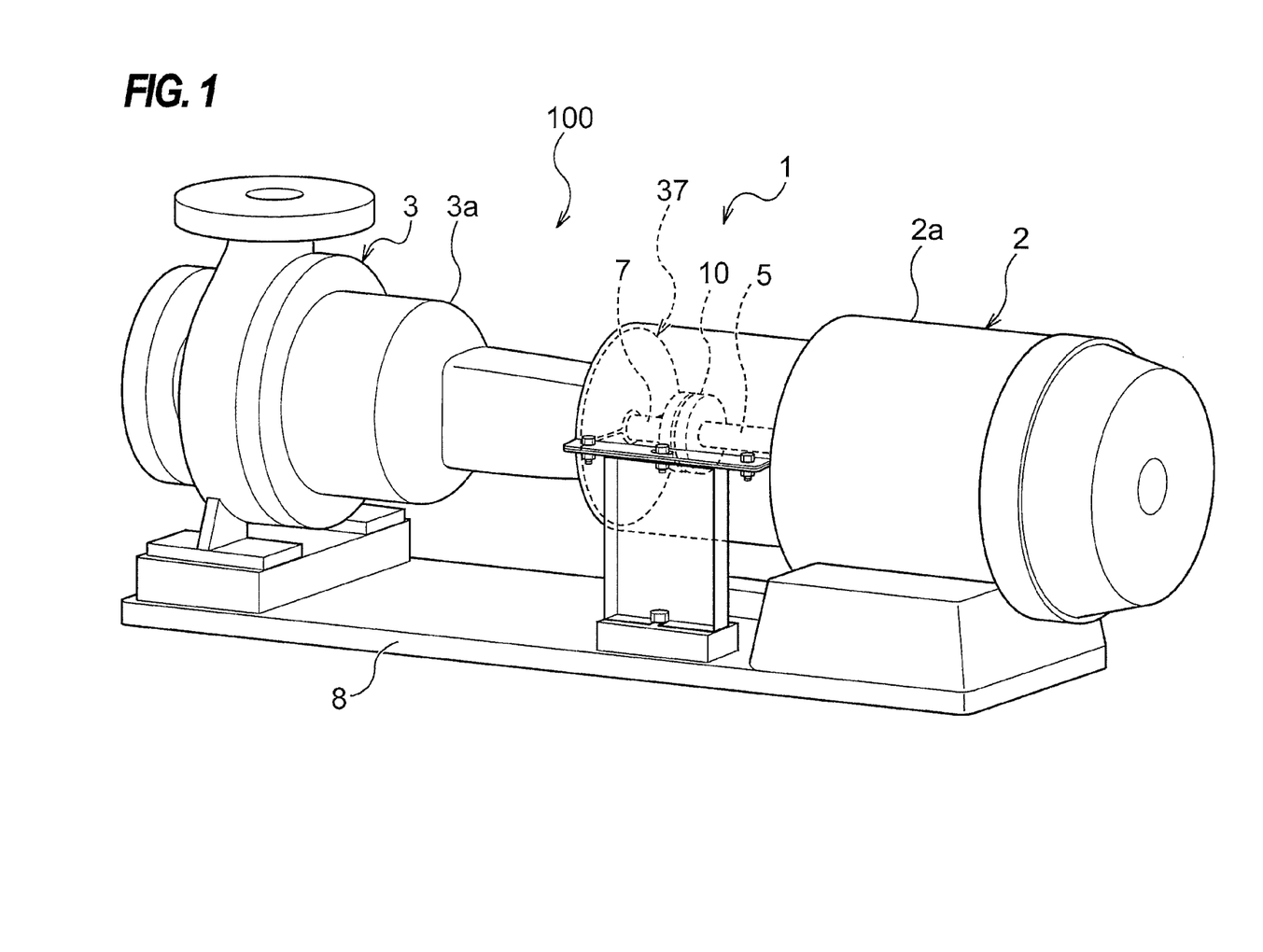
FIG. 1 is a schematic perspective view of a pump apparatus provided with a coupling guard according to an embodiment.

FIG. 1 is a schematic perspective view of a pump apparatus 100 including a coupling guard 1 according to an embodiment. The pump apparatus 100 includes a motor 2 which is a prime mover, and a pump 3 which is a rotary machine. The motor 2 and the pump 3 are fixedly mounted to a base 8. A drive shaft 5 of the motor 2 extends from a motor casing 2a of the motor 2 toward the pump 3. A rotational shaft 7 of the pump 3 extends from a pump casing 3a of the pump 3 toward the motor 2. The drive shaft 5 of the motor 2 is coupled to the rotational shaft 7 of the pump 3 by a coupling (or a shaft coupling) 10. In this embodiment, a central axis of the rotational shaft 7 of the pump 3 is aligned with a center axis of the drive shaft 5 of the motor 2.

Figure 2:
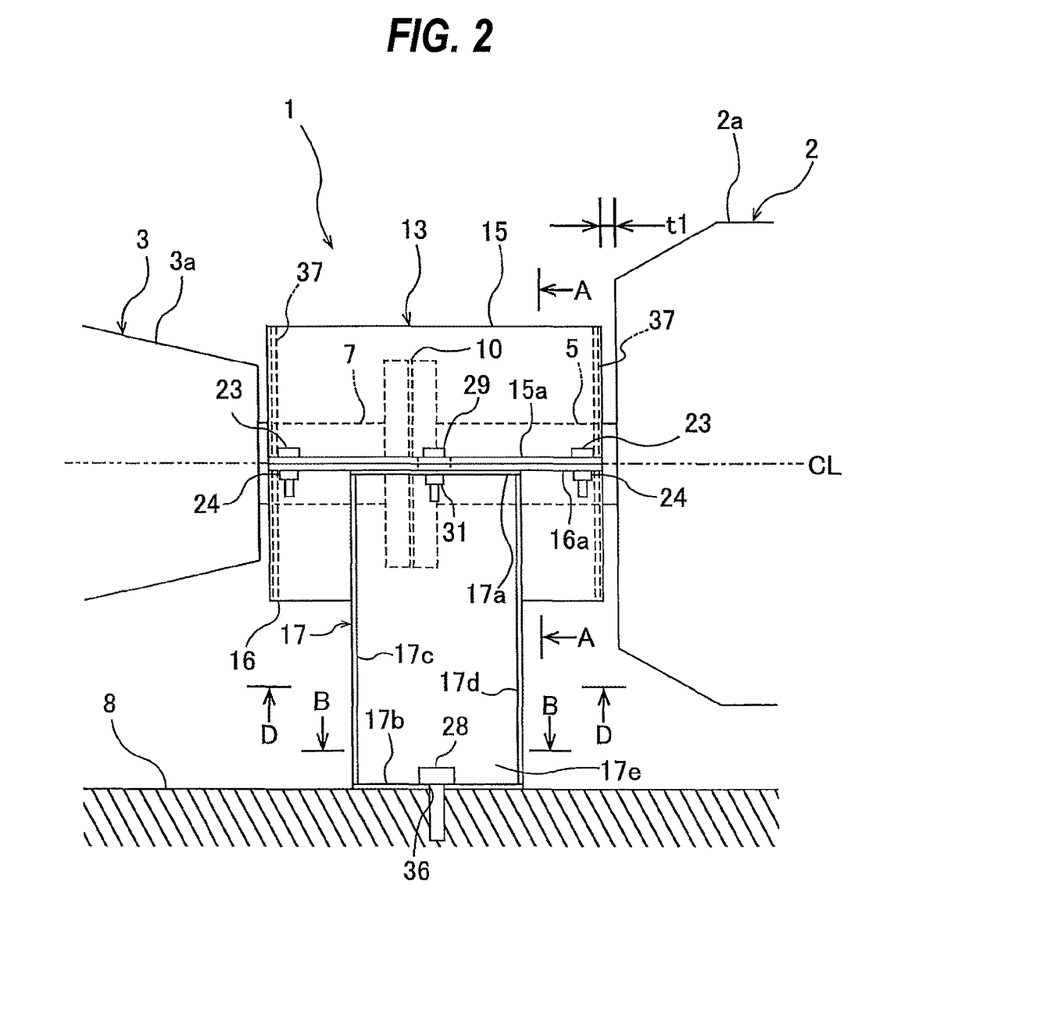
FIG. 2 is a side elevational view of the coupling guard shown in FIG. 1.
Figure 3:
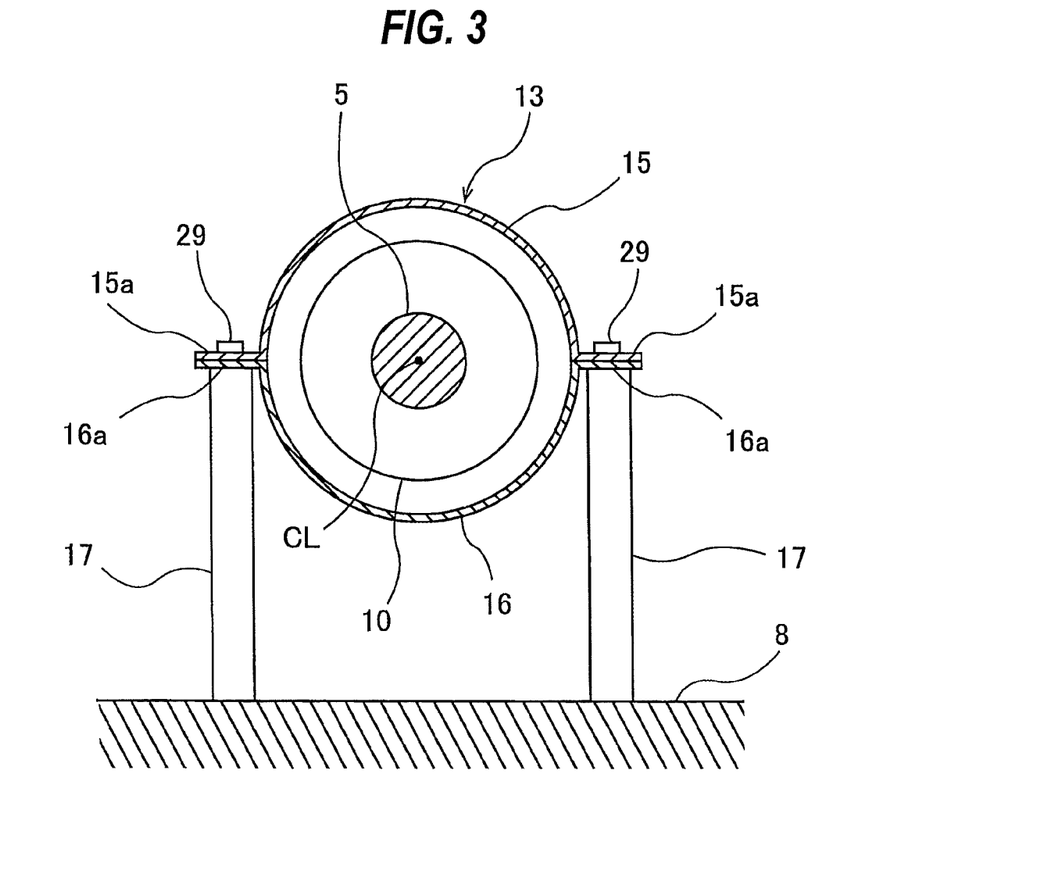
FIG. 3 is a cross-sectional view taken along line A-A of FIG. 2.
Figure 4:
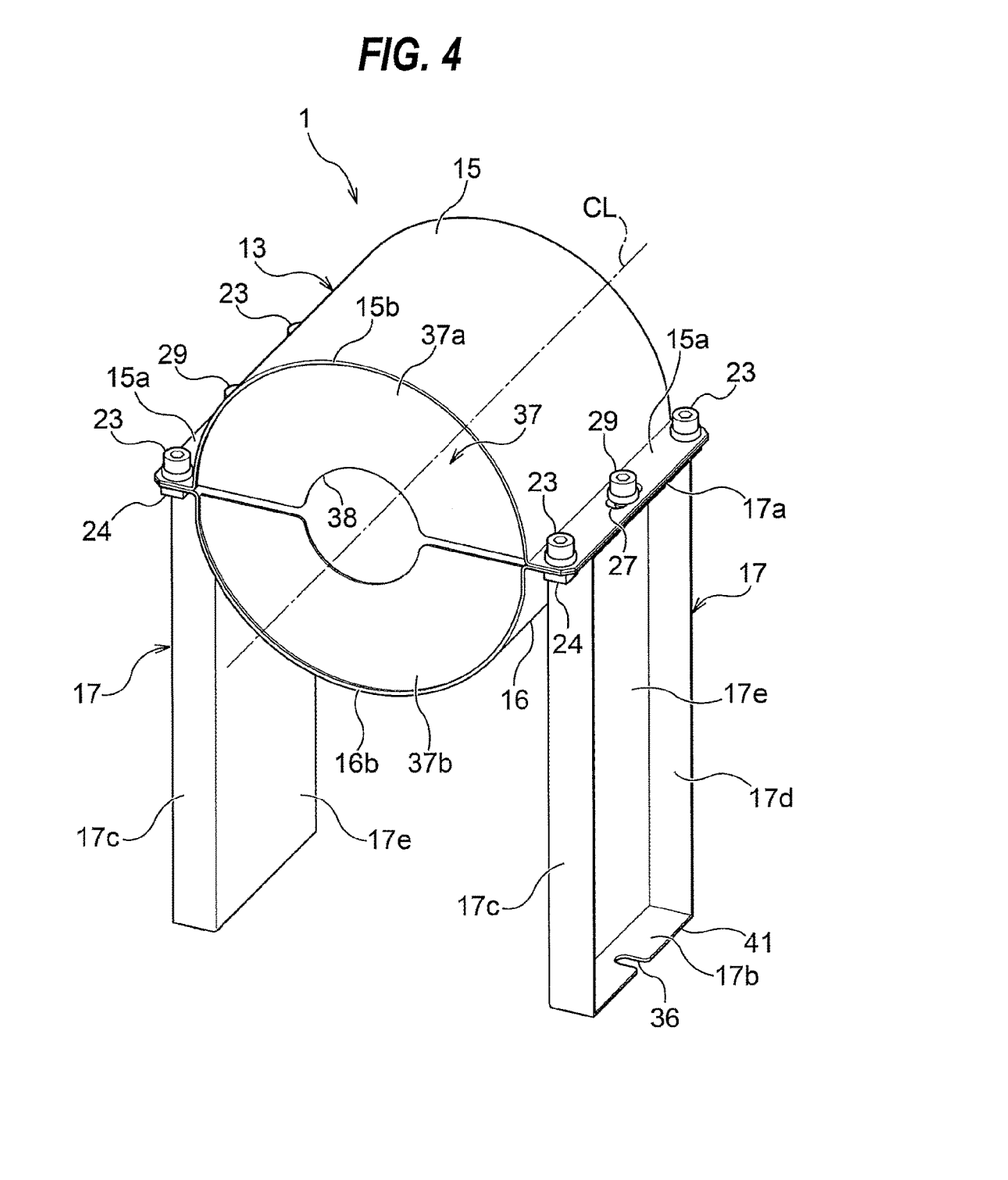
FIG. 4 is a perspective view of the coupling guard.

The coupling 10, an exposed portion of the drive shaft 5 of the motor 2, and an exposed portion of the rotational shaft 7 of the pump 3 are covered with the coupling guard 1. The coupling guard 1 will be described below with reference to FIG. 2 through FIG. 4. FIG. 2 is a side elevational view of the coupling guard shown in FIG. 1. FIG. 3 is a cross-sectional view taken along line A-A of FIG. 2. FIG. 4 is a perspective view of the coupling guard. The coupling guard 1 includes a guard body 13 having a cylindrical shape, and two guard legs 17 for supporting the guard body 13. In FIG. 2, a common central axis of the cylindrical guard body 13, the rotational shaft 7 of the pump 3, and the drive shaft 5 of the motor 2 is depicted by a two-dot chain line denoted by symbol CL.

The guard body 13 includes an upper semicylindrical member 15 and a lower semicylindrical member 16 which is attachable to and detachable from the upper semicylindrical member 15. The upper semicylindrical member 15 has, at its lower end, two upper flange portions 15a, 15a which protrude outwardly in radial direction of the upper semicylindrical member 15 from its lower end. The upper semicylindrical member 15 and the upper flange portions 15a, 15a are integral with each other.

The lower semicylindrical member 16 has, at its upper end, two lower flange portions 16a, 16a which protrude outwardly in radial direction from the lower semicylindrical member 16 from its upper end. The lower semicylindrical member 16 and the lower flange portions 16a, 16a are integral with each other. The upper flange portions 15a, 15a and the lower flange portions 16a, 16a are secured to each other by fastening tool comprising bolts 23 and nuts 24 engaging the bolts 23, whereby the upper semicylindrical member 15 and the lower semicylindrical member 16 are coupled to each other. When the bolts 23 and the nuts 24 are disengaged, the upper semicylindrical member 15 and the lower semicylindrical member 16 can be separated from each other.

The two guard legs 17 that support the guard body 13 have the same shape. Each of the guard legs 17 includes an upper wall 17a, a bottom wall 17b, a left-side wall 17c, a right-side wall 17d, and a vertical wall 17e. The upper wall 17a, the bottom wall 17b, the left-side wall 17c, the right-side wall 17d, and the vertical wall 17e are made of a single plate material. The upper wall 17a and the bottom wall 17b have been welded to the left-side wall 17c and the right-side wall 17d. More specifically, contact portion of the upper wall 17a and the left-side wall 17c, contact portion of the upper wall 17a and the right-side wall 17d, contact portion of the bottom wall 17b and the left-side wall 17c, and contact portion of the bottom wall 17b and the right-side wall 17d have been welded. These walls 17a to 17e constitute the guard leg 17 which has a box-shaped structure.

The vertical wall 17e is disposed parallel to the central axis CL of the guard body 13. The upper wall 17a, the bottom wall 17b, the left-side wall 17c, and the right-side wall 17d project perpendicularly and outwardly from the vertical wall 17e. More specifically, the upper wall 17a, the bottom wall 17b, the left-side wall 17c, and the right-side wall 17d project in a direction away from the central axis CL of the guard body 13.

As shown in FIG. 2 and FIG. 4, the bottom wall 17b has a cutout 36 formed therein in which a screw 28 for securing the guard leg 17 to the base 8 is inserted. The screw 28 is inserted through the cutout 36 to engage with a screw hole formed in the base 8, so that the guard leg 17 is fixed to the base 8.

Figure 5A:
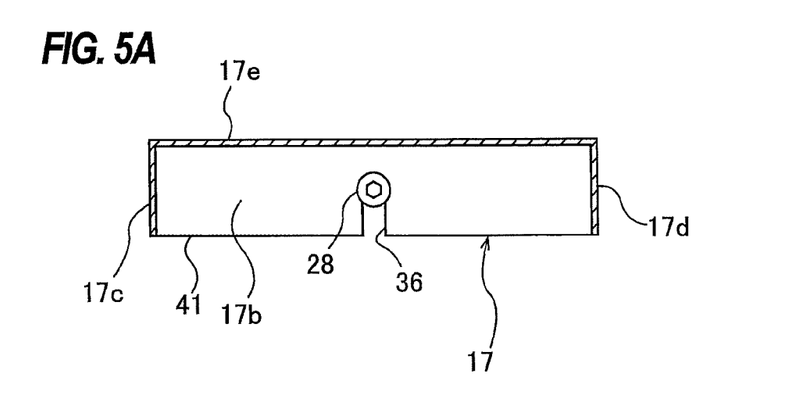
FIG. 5A is a cross-sectional view taken along line B-B of FIG. 2.
Figure 5B:
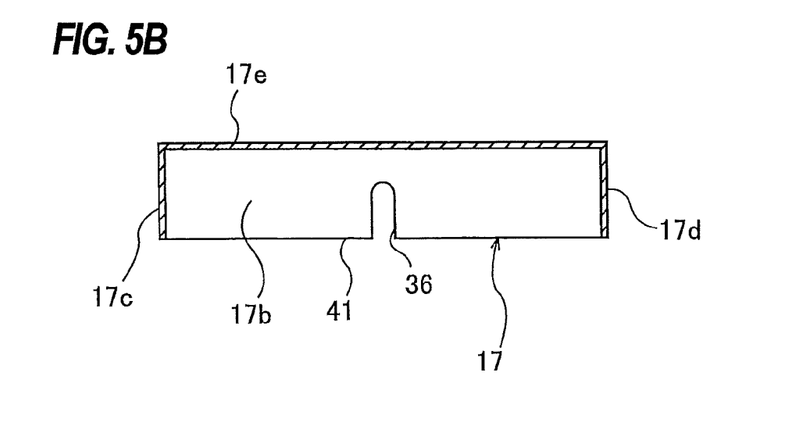
FIG. 5B is a view showing a cutout formed in a bottom wall of a guard leg.

FIG. 5A is a cross-sectional view taken along line B-B of FIG. 2, and FIG. 5B is a view showing the cutout 36 formed in the bottom wall 17b of the guard leg 17. As shown in FIGS. 5A and 5B, the cutout 36 is defined in an outer edge 41 of the bottom wall 17b. The cutout 36 extends inwardly from the outer edge 41 (i.e., toward the vertical wall 17e). This structure allows the guard leg 17 to be removed from the base 8 by slightly loosening the screw 28, without removing the screw 28 from the base 8.

Figure 6:
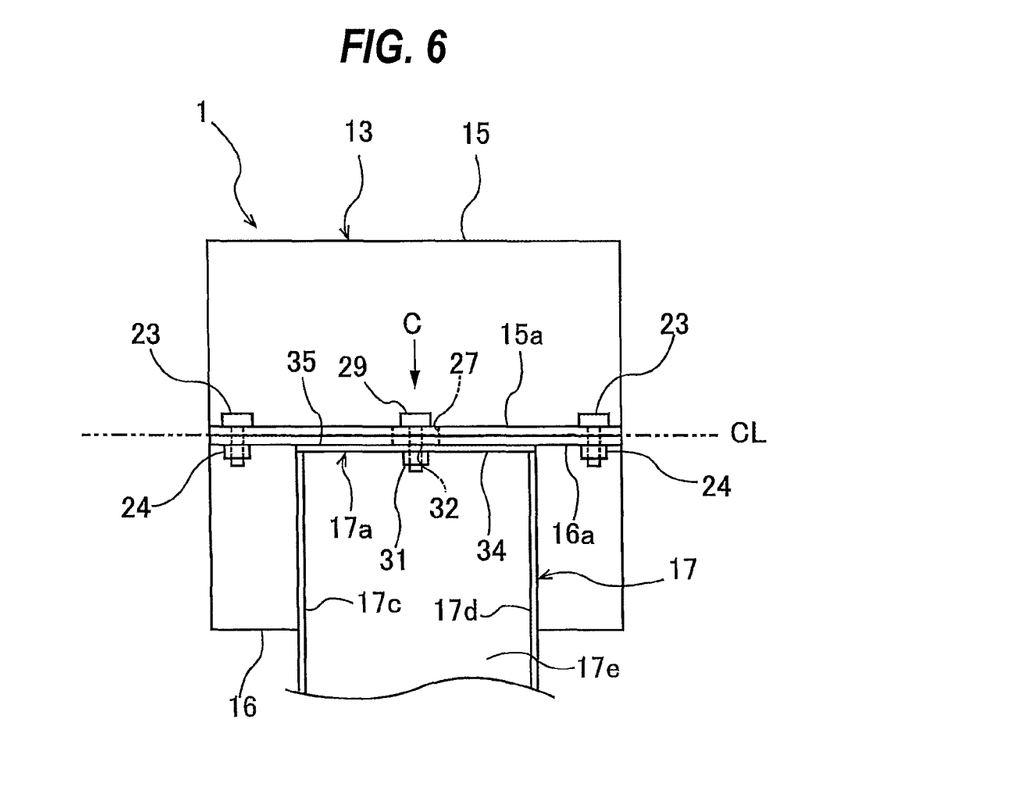
FIG. 6 is a view showing a junction between a lower flange portion and the guard leg.
Figure 7:
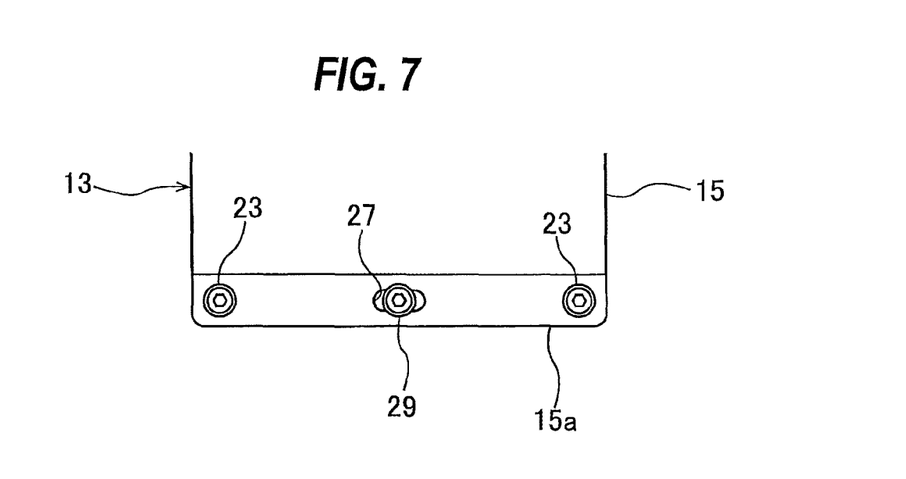
FIG. 7 is a view from a direction indicated by arrow C in FIG. 6.

FIG. 6 is a view showing a junction between the lower flange portion 16a and the guard leg 17. FIG. 7 is a view from a direction indicated by arrow C in FIG. 6. As shown in FIGS. 6 and 7, the upper flange portion 15a and the lower flange portion 16a have oblong holes 27 formed therein. A bolt 29 for coupling the guard body 13 to the guard leg 17 is inserted in the oblong holes 27. The oblong holes 27 extend parallel to the central axis CL, i.e., parallel to the rotational shaft 7 of the pump 3 and the drive shaft 5 of the motor 2.

Figure 8:
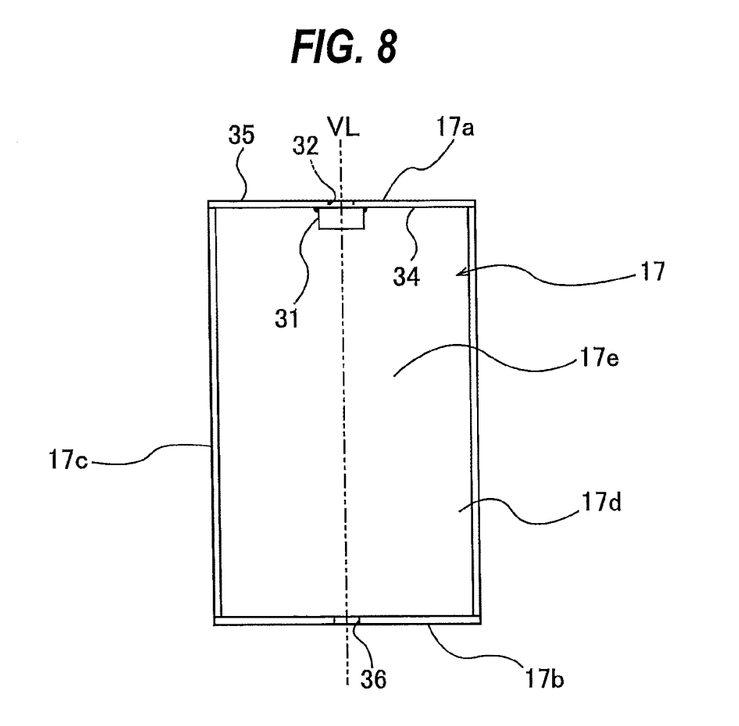
FIG. 8 is a front elevational view of the guard leg.

FIG. 8 is a front elevational view of the guard leg 17. As shown in FIG. 8, the upper wall 17a of the guard leg 17 has a through-hole 32 into which the bolt 29 is inserted. The upper wall 17a has an upper surface 35 which is in contact with a lower surface of the lower flange portion 16a, and further has a lower surface 34 at an opposite side from the upper surface 35. A nut 31 capable of engaging with the bolt 29 has been welded to the lower surface 34 of the upper wall 17a. The nut 31 and the through-hole 32 are concentric. The through-hole 32 and the cutout 36 are located on a vertical line CL that passes through a center of the guard leg 17. The guard leg 17 has a shape which is bilaterally symmetrical with respect to the vertical axis VL passing through the center of the guard leg 17. Therefore, the left and right guard legs 17 have the same shape.

As shown in FIG. 6, with the upper surface 35 of the upper wall 17a being in contact with the lower flange portion 16a, the bolt 29 is inserted into the oblong holes 27 and the through-hole 32. Because the nut 31 has been welded to the lower surface 34 of the upper wall 17a, the bolt 29 can easily engage with the nut 31 by simply rotating the bolt 29. With the nut 31 welded in advance to the guard leg 17, a working efficiency for attaching the guard leg 17 to the guard body 13 can be improved. In this embodiment, fastening tool for coupling the flange portions 15a, 16a and the guard leg 17 to each other comprises the bolt 29 and the nut 31.

As shown in FIG. 2, the coupling guard 1 faces the motor casing 2a of the motor 2 with a gap t1 formed therebetween. The magnitude of the gap t1 is preferably 8 mm or less. The gap t1 of 8 mm or less can prevent a finger of a human being from entering the gap t1. As a result, it is possible to prevent a finger of a human being from touching the drive shaft 5 of the motor 2 and the coupling 10.

The length of the drive shaft 5 may vary depending on the type of motor 2. In such a case, when the rotational shaft 7 of the pump 3 and the drive shaft 5 of the motor 2 are coupled to each other, the magnitude of the gap t1 varies.

Thus, this embodiment is configured to be able to adjust the gap t1 by allowing the guard body 13, with the bolt 29 slightly loosened, to move in directions in which the oblong holes 27 extend (i.e., parallel to the drive shaft 5). In other words, while the guard leg 17 is fixedly mounted to the base 8, only the guard body 13 can be moved parallel to the drive shaft 5.

As shown in FIG. 4, an annular wall 37 is provided on the guard body 13. The annular wall 37 is disposed on a pump-side open end (or a rotary-machine-side open end) of the guard body 13. As shown in FIG. 2, an annular wall 37 is also disposed on a motor-side open end (or a prime-mover-side open end) of the guard body 13. The annular wall 37 will be described below with reference to FIG. 4. As shown in FIG. 4, the annular wall 37 has been divided into an upper wall 37a and a lower semiannular wall 37b. The upper semiannular wall 37a has been welded to an inner circumferential surface of the upper semicylindrical member 15, and the lower semiannular wall 37b has been welded to an inner circumferential surface of the lower semicylindrical member 16. The annular wall 37 is perpendicular to the central axis CL.

The annular wall 37 has a hole 38 through which the drive shaft 5 of the motor 2 or the rotational shaft 7 of the pump 3 can extend. The annular wall 37 can reliably prevent a finger of a human being from touching the drive shaft 5, the rotational shaft 7, and the coupling 10 which are located within the coupling guard 1. If the magnitude of the gap t1 is 8 mm or less, the annular wall 37 may not be provided on the motor-side open end (prime-mover-side open end).

Figure 9:
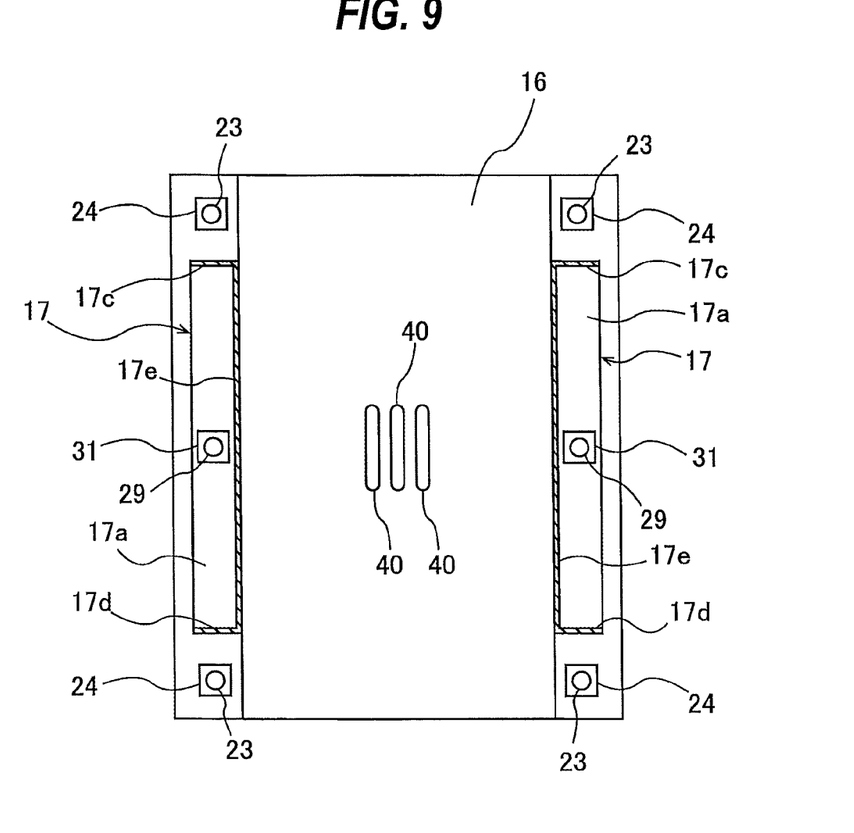
FIG. 9 is a cross-sectional view taken along line D-D of FIG. 2.

FIG. 9 is a cross-sectional view taken along line D-D of FIG. 2. As shown in FIG. 9, the lower semicylindrical member 16 has a plurality of (three in the present embodiment) drain holes 40 formed in the lowermost portion of the lower semicylindrical member 16. The pump apparatus 100 may be installed outdoors. Even in such a case, rain that has entered the coupling guard 1 is discharged out through the drain holes 40. Although the three drain holes 40 are provided in this embodiment, the number of drain holes 40 is not limited to this embodiment.

As the pump apparatus 100 operates, materials, such as rubber, of the coupling (shaft coupling) 10 may wear, thus generating wear particles. Such wear particles are discharged out through the drain holes 40. By checking the fact that the wear particles have been discharged out, it is possible to judge that the coupling 10 is not working properly.

Figure 10:
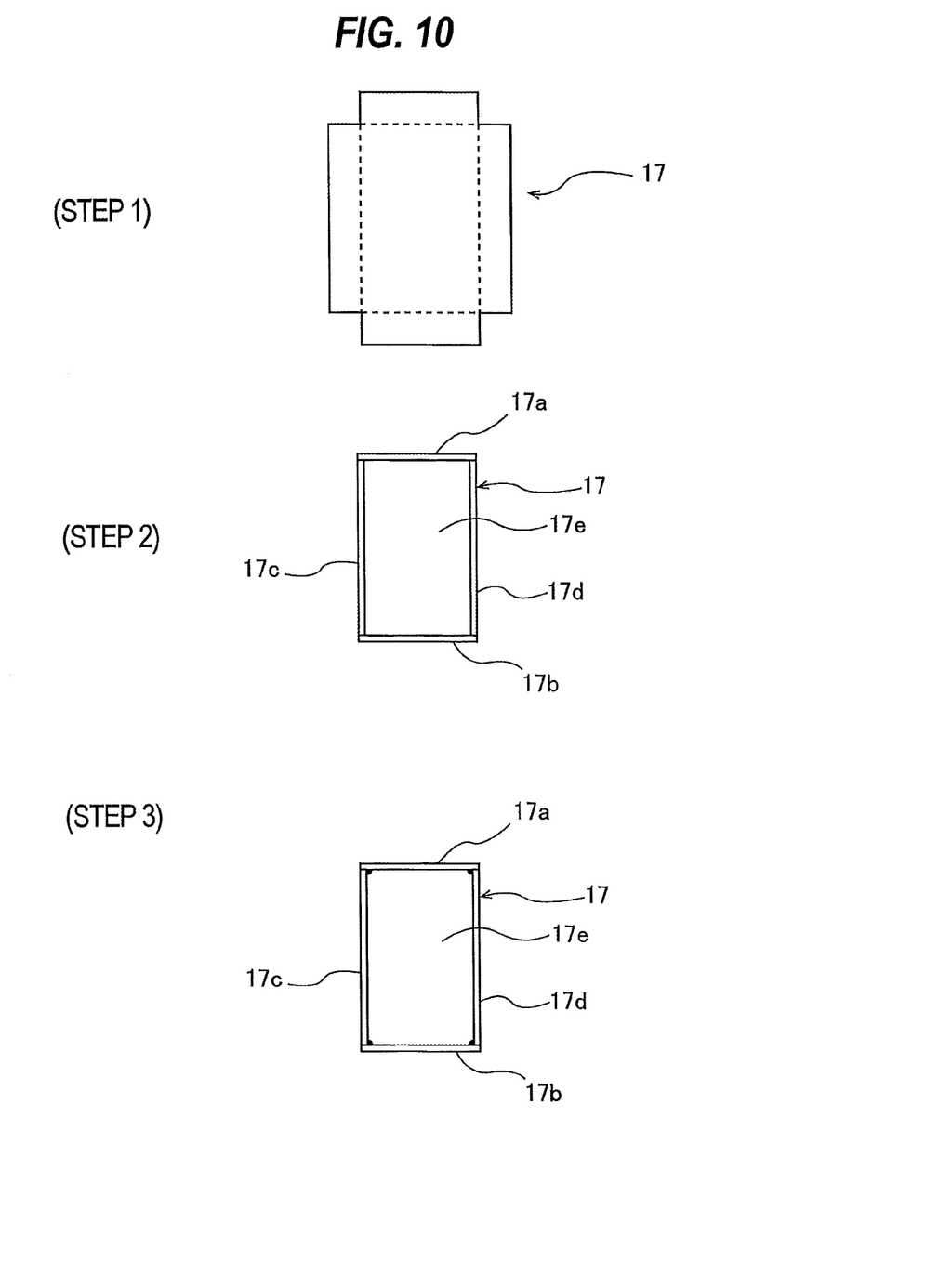
FIG. 10 is a set of views showing a process of manufacturing the guard leg.

A process of manufacturing the guard leg 17 will now be described with reference to FIG. 10. FIG. 10 is a set of views showing the process of manufacturing the guard leg 17. In FIG. 10, depiction of the through-hole 32 and the cutout 36 is omitted. As shown in FIG. 10, a single rectangular plate material, whose four corners have been cut off, is prepared (step 1). Preferably, SPCC (steel sheet) is used as the plate material. Four edges of the plate material are folded, thereby forming the upper wall 17a, the bottom wall 17b, the left-side wall 17c, and the right-side wall 17d, so that the guard leg 17 is fabricated (step 2).

Then, the upper wall 17a and the bottom wall 17b are welded to the left-side wall 17c and the right-side wall 17d, thereby fabricating the guard leg 17 (step 3). More specifically, the contact portion of the upper wall 17a and the left-side wall 17c, the contact portion of the upper wall 17a and the right-side wall 17d, the contact portion of the bottom wall 17b and the left-side wall 17c, and the contact portion of the bottom wall 17b and the right-side wall 17d are welded together. Because the guard leg 17 has a box-shaped structure and its four corners are welded, the rigidity of the guard leg 17 is enhanced.

As shown in FIG. 8, the guard leg 17 has a shape which is bilaterally symmetrical with respect to the vertical axis VL extending through the center of the guard leg 17, each guard leg 17 can be used as either a right guard leg or a left guard leg. Consequently, the number of guard legs 17 in stock can be reduced upon mass-production of the coupling guards 1. Moreover, since a plurality of guard legs 17 having the same shape can be manufactured, manufacturing costs can be reduced.

According to the present embodiment, the coupling guard 1 is simple in structure, because the coupling guard 1 is constituted by a relatively small number of parts, i.e., one upper semicylindrical member 15, one lower semicylindrical member 16, and two guard legs 17 of the same shape. Furthermore, the guard body 13 and the guard legs 17 are coupled together by a simple mechanism, and the guard legs 17 are also fixed to the base 8 by a simple mechanism. Consequently, even when the drive shaft 5 of the motor 2 and the rotational shaft 7 of the pump 3 are coupled to each other, the coupling guard 1 can be easily assembled and disassembled.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

What is claimed is:

1. A coupling guard for covering a coupling which couples a drive shaft of a prime mover and a rotational shaft of a rotary machine to each other, the coupling guard comprising:
    a guard body in a cylindrical shape, the guard body having an upper semicylindrical member and a lower semicylindrical member coupled to the upper semicylindrical member; and
    a guard leg supporting the guard body,
    wherein the guard body has a flange portion to which the guard leg is attached,
    the guard leg includes a vertical wall parallel to a central axis of the guard body, and further includes an upper wall, a bottom wall, a left-side wall, and a right-side wall which project perpendicularly and outwardly from the vertical wall, and
    the vertical wall, the upper wall, the bottom wall, the left-side wall, and the right-side wall are constituted by a single plate material.

2. The coupling guard according to claim 1, wherein the flange portion and the guard leg are coupled to each other by a fastening tool;
    the flange portion has an oblong hole in which the fastening tool is inserted; and
    the oblong hole extends parallel to the central axis of the guard body.

3. The coupling guard according to claim 1, wherein the guard leg has a shape which is bilaterally symmetrical with respect to a vertical line extending through a center of the guard leg.

4. The coupling guard according to claim 1, wherein the upper wall and the bottom wall have been welded to the left-side wall and the right-side wall.

5. The coupling guard according to claim 1, wherein:
the bottom wall of the guard leg has a cutout in which a screw is inserted; and
the cutout is formed in an outer edge of the bottom wall.

6. The coupling guard according to claim 1, wherein the lower semicylindrical member has a drain hole formed in a lowermost portion of the lower semicylindrical member.

7. The coupling guard according to claim 1, further comprising:
an annular wall disposed on the guard body, the annular wall being perpendicular to the central axis, and the annular wall having a hole through which the drive shaft or the rotational shaft can extend.

8. The coupling guard according to claim 1, wherein the vertical wall is perpendicular to the flange portion.

9. The coupling guard according to claim 1, wherein the vertical wall is planar and disposed on an imaginary plane that extends in an axial direction with respect to the cylindrical shape of the guard body and is perpendicular to the bottom wall of the guard leg.

10. A coupling guard for covering a coupling which couples a drive shaft of a prime mover and a rotational shaft of a rotary machine to each other, the coupling guard comprising:
a guard body in a cylindrical shape, the guard body having an upper semicylindrical member and a lower semicylindrical member coupled to the upper semicylindrical member; and a guard leg supporting the guard body, wherein:

the guard body has a flange portion to which the guard leg is attached;

the guard leg includes a vertical wall parallel to a central axis of the guard body, and further includes an upper wall, a bottom wall, a left-side wall, and a right-side wall which project perpendicularly and outwardly from the vertical wall;

the vertical wall, the upper wall, the bottom wall, the left-side wall, and the right-side wall are constituted by a single plate material;

the flange portion and the guard leg are coupled to each other by a fastening tool;

the flange portion has an oblong hole in which the fastening tool is inserted;

the oblong hole extends parallel to the central axis of the guard body;

the fastening tool comprises a bolt and a nut;

the upper wall of the guard leg has a through-hole in which the bolt is inserted; and the nut has been welded to a lower surface of the upper wall, the through-hole and the nut being concentric.

* * * * *

UNITED STATES PATENT AND TRADEMARK OFFICE
CERTIFICATE OF CORRECTION

PATENT NO. : 10,030,814 B2
APPLICATION NO. : 15/135865
DATED : July 24, 2018
INVENTOR(S) : Wei et al.

Page 1 of 1

It is certified that error appears in the above-identified patent and that said Letters Patent is hereby corrected as shown below:

In the Specification

Column 3, Line 67, "17e" should read --17c--

Signed and Sealed this
Sixteenth Day of October, 2018

Andrei Iancu
*Director of the United States Patent and Trademark Office*